United States Patent [19] [11] 4,227,711
Wheeler [45] Oct. 14, 1980

[54] 3-AXLE WALKING BEAM SUSPENSION
[75] Inventor: John G. Wheeler, San Jose, Calif.
[73] Assignee: The United States of America as represented by the Secretary of the Navy, Washington, D.C.
[21] Appl. No.: 945,676
[22] Filed: Sep. 25, 1978
[51] Int. Cl.³ .............................................. B62D 21/00
[52] U.S. Cl. .................................. 280/81 R; 280/677
[58] Field of Search ............... 280/677, 678, 679, 680, 280/681, 81 R

[56] References Cited
U.S. PATENT DOCUMENTS

| 3,471,166 | 10/1969 | Clark | 280/677 |
| 3,473,820 | 10/1969 | Chaney | 280/677 |
| 3,810,516 | 5/1974 | Reimer | 280/677 |

Primary Examiner—John J. Love
Assistant Examiner—John A. Carroll
Attorney, Agent, or Firm—R. S. Sciascia; Charles D. B. Curry; Francis I. Gray

[57] ABSTRACT

A three-axle walking beam suspension for sharing a load in a predetermined ratio without using any sliding type connections. Three interconnected walking beams on each side of the center line of a vehicle are pivotally connected to the axles. A primary walking beam is pivotally connected at an intermediate point to the vehicle frame and at each end to an intermediate point of a front and rear secondary walking beam, respectively. The front and rear secondary walking beams are pivotally interconnected about the intermediate axle and rotatively connected to the front and rear axles, respectively.

4 Claims, 5 Drawing Figures

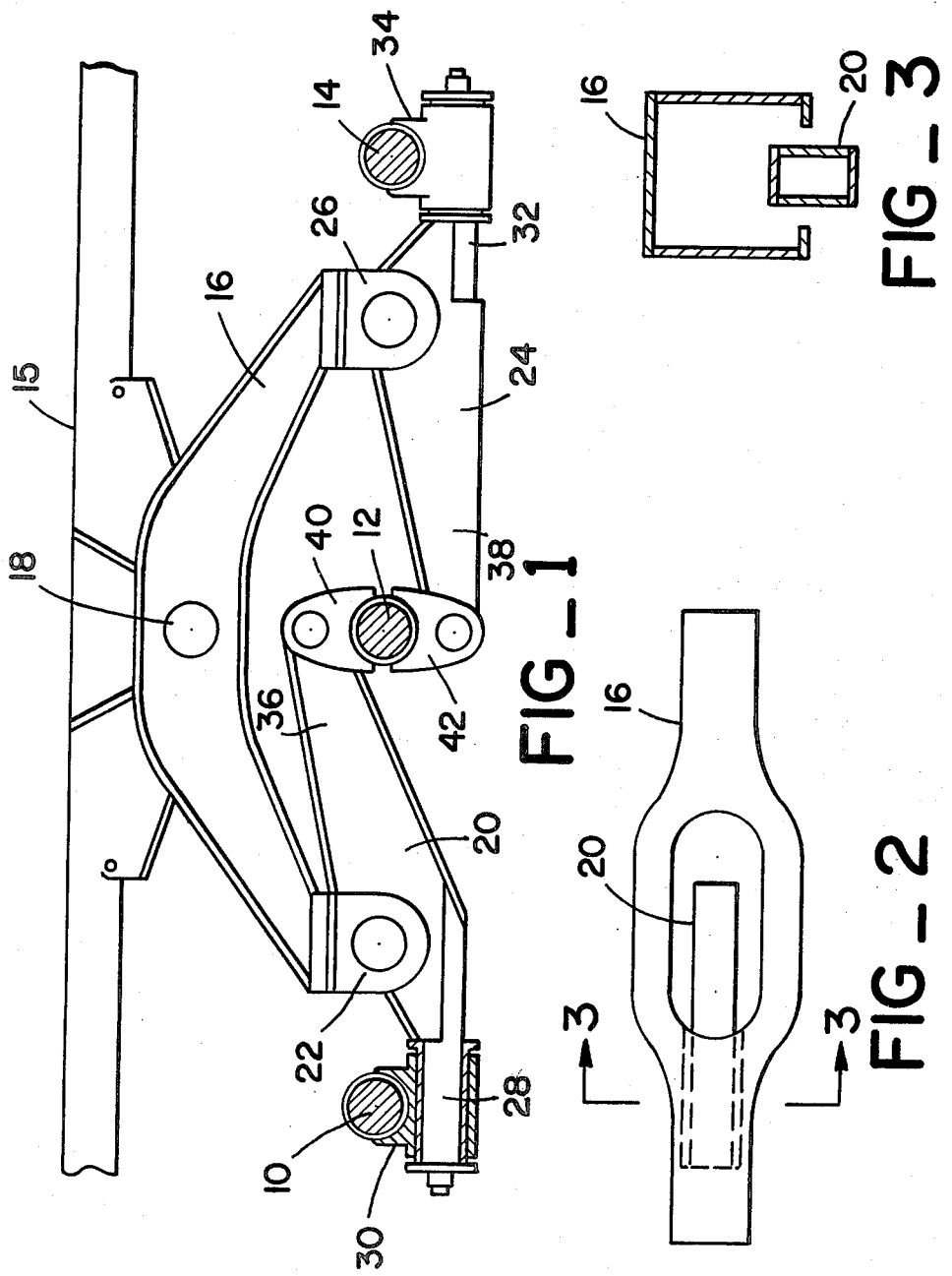

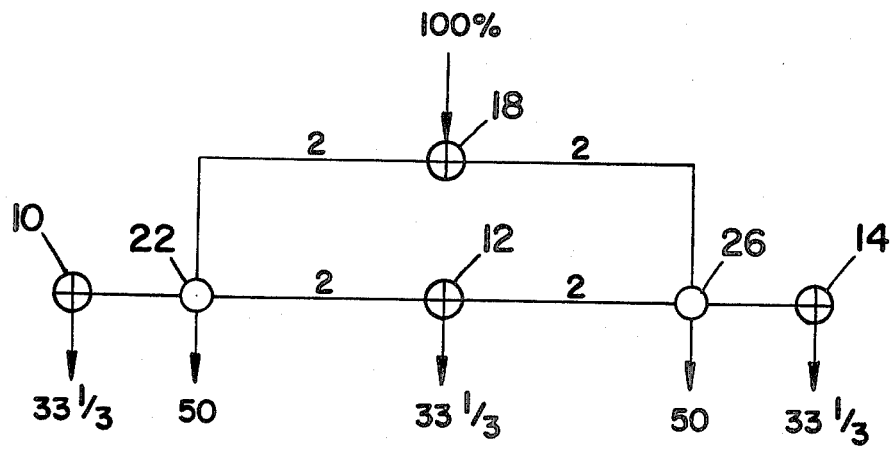
FIG_4a
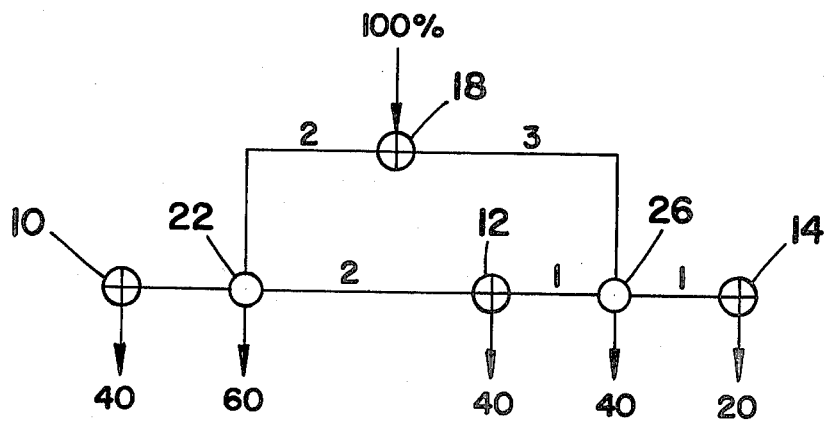
FIG_4b

3-AXLE WALKING BEAM SUSPENSION

BACKGROUND OF THE INVENTION

1. Field of the Invention

The present invention relates to multiaxle suspensions, and more particularly to a three-axle walking beam suspension.

2. Description of the Prior Art

In large, heavy-duty vehicles it is desirable to divide the load among a plurality of axles. In such cases it is common to use walking beams for supporting the axles to maintain the wheels on the various axles in contact with the terrain over which the vehicle passes, and to attempt to equalize the load on the various axles. U.S. Pat. No. 3,471,166 entitled, "Heavy-Duty Multiple Axle Vehicle", issued on Oct. 7, 1969 to Edmund G. Clark, illustrates a three-axle suspension having a primary walking beam fulcrumed to a vehicle frame with a pair of secondary walking beams fulcrumed beneath each end, the secondary walking beams being interconnected by a sliding, pivotal connection. However, under load and actual conditions, the pin of the sliding connection does not slide easily, resulting in excessive wear with attendant high maintenance. To make the sliding connection functional require greater sophistication at a greater cost.

SUMMARY OF THE INVENTION

Accordingly, the present invention provides a three-axle walking beam suspension for sharing a load in a predetermined ratio without using any type of sliding connections. Three interconnected walking beams, a primary walking beam and two secondary walking beams on each side of the center line of a vehicle, are pivotally connected to the axles. The primary walking beam is pivotally connected at an intermediate point to the vehicle frame and at each end to an intermediate point of the front and rear secondary walking beams, respectively, the pivot axes being orthogonal to the vehicle center line. The front and rear secondary walking beams are pivotally interconnected at the intermediate axle about axes orthogonal to the vehicle center line, and rotatively connected to the front and rear axles, respectively, about an axis parallel to the vehicle center line.

Therefore, it is an object of the present invention to provide a three-axle walking beam suspension without any type of sliding connections.

Another object of the present invention is to provide a three-axle walking beam suspension which allows high excursions of any axle while maintaining a predetermined shared load condition.

Still another object of the present invention is to provide a three-axle walking beam suspension capable of transporting heavier loads, yet being of a simpler configuration to reduce cost.

Other objects, advantages and novel features of the present invention will be apparent from the following detailed description when read in view of the appended claims and attached drawing.

BRIEF DESCRIPTION OF THE DRAWING

FIG. 1 is a partial sectional side view of a multiaxle walking beam suspension according to the present invention.

FIG. 2 is a top plan view of a primary beam which allows one of the secondary beams to ride up within the primary beam.

FIG. 3 is a sectional view of the primary and secondary beams of FIG. 2 taken along line III—III.

FIG. 4a is a load diagram for equal load on all axles.

FIG. 4b is a load diagram for a 40-40-20 load on the axles.

DESCRIPTION OF THE PREFERRED EMBODIMENT

Referring now to the FIG. 1 three axles, a forward axle 10, an intermediate axle 12 and a rear axle 14, which may be driving or nondriving, are connected to a vehicle chassis frame 15 by three interconnected walking beams on each side of the vehicle center line. A primary walking beam 16 is pivotally attached at an intermediate point 18 to the vehicle chassis frame 15 with the pivot axis orthogonal to the vehicle center line and approximately parallel to the axles. A forward secondary walking beam 20 is pivotally connected at an intermediate point along its length to the front end 22 of the primary walking beam 16, the pivot axis being parallel to the primary walking beam pivot axis. A rear secondary walking beam 24 is pivotally connected at an intermediate point along its length to the rear end 26 of the primary walking beam 16, the pivot axis being parallel to the primary walking beam pivot axis.

The forward end 28 of the forward secondary walking beam 20 is connected to the forward axle 10 through a journaled bracket 30 which allows the forward secondary walking beam to rotate about an axis parallel to its length and the vehicle center line. The rear end 32 of the rear secondary walking beam 24 is connected likewise to the rear axle 14 through a journaled bracket 34. The rear end 36 of the forward secondary walking beam 20 and the front end 38 of the rear secondary walking beam 24 are pivotally connected through brackets 40 and 42, respectively, to the intermediate axle 12, the pivot axes being parallel to the primary walking beam pivot axis.

The three interconnected walking beams are proportioned to give a desired distribution of loading, either equal or according to a predetermined ratio. On level terrain the axle axes and the pivot axes at the front end 22 and the rear end 26 of the primary walking beam 16 lie in the same plane. For excursions over rough terrain, the axles are free to move with high excursions while maintaining the ratio of loading of the three axles essentially constant. To allow for free upward excursion of the intermediate axis 12, and to reduce the frame height, the primary beam 16 may be split as shown in FIGS. 2 and 3 to allow the forward secondary beam 20 to ride up within the primary beam.

The loading of the axles is shown in FIG. 4, with FIG. 4a demonstrating the lever arm ratios for an equally distributed load on all three axles. However, if some of the axles are driven, it may be desirable to increase the load on the driven axles as opposed to the undriven axles. For such a situation, a 40-40-20 load distribution may be desirable as shown in FIG. 4b. Other predetermined load ratios may also be chosen depending upon the design requirements, and can readily be obtained in like manner.

Thus, the present invention provides a multi-axle walking beam suspension for sharing a load in a predetermined ratio without using any type of sliding connections, resulting in a simpler and less costly functional design while allowing high excursions of the individual axles with essentially constant load sharing.

What is claimed is:

1. A three-axle walking beam suspension for a vehicle having a frame comprising:
   (a) a pair of primary walking beams pivotally connected at an intermediate point to said frame, one on each side of the center line of said vehicle;
   (b) a laterally opposite pair of front secondary walking beams, one pivotally connected to the front end of each primary walking beam at an intermediate point of the length of each front secondary walking beam;
   (c) a laterally opposite pair of rear secondary walking beams, one pivotally connected to the rear end of each primary walking beam at an intermediate point of the length of each rear secondary walking beam;
   (d) a front axle extending across the front end portions of said front secondary walking beams and connected to said front secondary walking beams for rotative movement of said front axle relative to said front secondary walking beams about an axis parallel to the center line of said vehicle;
   (e) a rear axle extending across the rear end portions of said rear secondary walking beams and connected to said rear secondary walking beams for rotative movement of said rear axle relative to said rear secondary walking beams about an axis parallel to the center line of said vehicle; and
   (f) an intermediate axle extending across the front portions of said rear secondary walking beam and the rear portions of said front secondary walking beams such that said front and rear secondary walking beams are pivotally connected to said intermediate axle.

2. A three-axle walking beam suspension as recited in claim 1 further comprising a bracket attached to said intermediate axle to which said front and rear secondary walking beams are pivotally connected above and below said intermediate axis, respectively.

3. An improved three-axle walking beam suspension of the type having a primary beam pivotally mounted at an intermediate point to the frame of a vehicle and two secondary beams pivotally mounted at intermediate points to the ends of said primary beam, the secondary beam being rotatively connected at the respective outer ends to the front and rear vehicle axes, the improvement comprising:

the intermediate axle extending across the front portions of said rear secondary walking beams and the rear portions of said front secondary walking beams such that said front and secondary walking beams are pivotally connected to said intermediate axle.

4. An improved three-axle walking beam suspension as recited in claim 3 further comprising a bracket to which the intermediate axle is rotatively connected and to which said front and rear secondary walking beams are pivotally connected above and below the intermediate axle, respectively.

* * * * *